United States Patent Office 2,872,422
Patented Feb. 3, 1959

2,872,422

ICE RELEASING COATING COMPOSITION COMPRISING NITROCELLULOSE, OIL MODIFIED ALKYD, VINYL POLYMER, WAX, AND ORGANIC SOLVENT

Clifford J. Rolle, Tuckahoe, Jerome Roteman, Brooklyn, and William D. Barnes, Jr., New York, N. Y., assignors to Interchemical Corporation, New York, N. Y., a corporation of Ohio No Drawing. Application June 22, 1954
Serial No. 438,632

9 Claims. (Cl. 260—16)

The present invention relates to coating compositions; more particularly the invention relates to coating compositions which when applied to surfaces will give a coating from which ice can be readily removed.

The need for coatings from which ice can be readily removed is well recognized, especially on naval aircraft. Planes which are exposed on carriers in wet cold weather rapidly become coated with ice and this ice must be removed before the planes take off on a flight. To be suitable for use as an ice-releasing coating composition, the composition must in addition (1) be suitable for application to exterior surfaces of aircraft, (2) have good package stability at temperatures of between about $-40°$ F. and $+170°$ F., (3) not affect adversely the metals, finishes and plastics used in aircraft construction, (4) be low in toxicity, (5) have a pour point below $-40°$ F., (6) be no more flammable than paints currently applied to aircraft, (7) be capable of pigmentation in various colors, (8) possess suitable hardness and adhesion to aircraft metals and paints after 48 hours' air-drying time, and (9) must be effective for numerous repeated icing and de-icing.

We have now discovered a composition which possesses the above requirements to a remarkable degree and when applied as a coating, releases ice with less applied force than any heretofore known coating. The compositions contain as essential ingredients: nitrocellulose, non-drying oil alkyd resin, vinyl resin, petroleum hydrocarbon wax and volatile solvent. Optional ingredients include a dimethyl polysiloxane oil and a plasticizer.

The nitrocellulose can be any grade of commercially available nitrocellulose that is recommended for lacquers. Hydrocarbon waxes, derived from petroleum, are, in general, operable in the invention. For instance we have found that a product marketed under the trade-name "#1185 TAW" wax, which melts at 185° F., is especially suitable.

The non-drying oil alkyd resin is any commercially available alkyd resin, containing up to about 45% non-drying oil modification.

The vinyl resin is a polymer of vinyl acetate and is preferably a copolymer of vinyl chloride and vinyl acetate, containing not more than 65% vinyl chloride, since the vinyl resin must be compatible with nitrocellulose. We have found that a copolymer containing about 62% vinyl chloride and 38% vinyl acetate is particularly effective. Any suitable plasticizer for nitrocellulose and vinyl resin may be used in the formulation of the de-icing composition.

The following ratios of ingredients are operable in the invention:

| | Parts |
|---|---|
| Nitrocellulose | 10 |
| Non-drying alkyd resin | 10 to 20 |
| Vinyl resin | 2.5 to 5.0 |
| Hydrocarbon wax | 0.1 to 0.3 |

The ingredients are dissolved in sufficient volatile organic solvent to give a 20 to 25% solids solution, or suitable body for spray application. When plasticizer is to be used in the formulation, it is used to the extent of 2 to 4 parts for each 10 parts of nitrocellulose. Other conventional additives may be included in the formulation. For instance, pigmented coatings are prepared merely by dispersing the desired pigment in the formulation in conventional manner.

The addition of traces of an oily polysiloxane polymer to the formulation often increases the drying rate without adversely affecting the ice-release properties, and in some instances, the ice-release properties may be improved by this additive.

The following examples in which the parts are by weight will further illustrate the invention:

Example 1

| | Parts |
|---|---|
| ½″ RS nitrocellulose | 10 |
| Glyptal resin #2570 | 20 |
| Vinylite VYCC | 5 |
| Tricresyl phosphate | 3 |
| Hydrocarbon wax, M. P. 185° F. | 0.2 |
| Silicone oil SF–96 (40) | 0.6 |
| Lacquer thinner | 60.9 |

Glyptal resin #2570 is a 30% coconut oil modified glycerol-phthalate resin. Vinylite VYCC is a 38:62 copolymer of vinyl acetate and vinyl chloride. The silicone oil SF–96 (40) is a dimethyl polysiloxane of 40 centistokes viscosity at 100° F. The lacquer thinner is a mixture of volatile organic solvents consisting of 60% toluol, 30% butyl acetate and 10% Butyl alcohol.

Example 2

A Sea Blue lacquer was produced by incorporating titanium dioxide (rutile), 2.30%; Iron Blue, 2.18%; iron oxide, 0.64%; and carbon black, 0.28%; into the clear lacquer of Example 1.

The formulations of Examples 1 and 2 both give good weather resistant ice-release coatings.

Ice-release properties were measured in terms of the average torque, in pounds, per square inch, obtained by averaging six readings on an instrument that measures the horizontal rotary or twisting force required to remove a lump of ice from a coated surface on which it has been frozen at 0° C. or below. Using this method the ice-ophobic properties of coatings of Examples 1 and 2 are of the order of 3 pounds per square inch, compared to about 47 for a previously used coating, containing nitrocellulose and an alkyd resin.

The following examples in which only the solids contents of the lacquers are given will further illustrate the ice-ophobic coatings of the present invention.

Example 3

8 parts ½″ R. S. nitrocellulose
4 parts Vinylite VYCC
8 parts Glyptal 2570
3 parts Hercoflex #150
0.16 part #185 TAW wax, M. P. 185° F.
Average torque/in.²—10.40 lbs.

Hercoflex #150 is a blend of octyl phthalate and decyl phthalate.

Example 4

8 parts ½″ R. S. nitrocellulose
8 parts Vinylite VYCC
8 parts Glyptal 2570
3 parts Hercoflex #150
0.19 part TAW wax
Average torque/in.²—10.43 lbs.

Example 5

10 parts ½" R. S. nitrocellulose
5 parts Vinylite VYCC
20 parts Glyptal 2570
0.25 part TAW wax
0.35 part silicone oil SF-96
Average torque/in.²—2.46 lbs.

Example 6

10 parts ½" R. S. nitrocellulose
5 parts Vinylite VYCC
20 parts Glyptal 2556
0.25 part TAW wax
0.35 part silicone oil SF-96
Average torque/in.²—2.56 lbs.

Glyptal 2556 is a 38% castor oil modified glycerol phthalate resin.

Example 7

10 parts ½" R. S. nitrocellulose
5 parts Vinylite VYCC
20 parts Glyptal 2477
0.25 part TAW wax
0.35 part silicone oil SF-96
Average torque/in.²—3.42 lbs.

Glyptal 2477 is a 45% castor oil modified glycerol phthalate resin.

Example 8

10 parts ½" R. S. nitrocellulose
5 parts Vinylite VYCC
20 parts Glyptal 2477
0.25 part TAW wax
Average torque/in.²—3.39 lbs.

Example 9

10 parts ½" R. S. nitrocellulose
5 parts Vinylite VYCC
17.5 parts Glyptal 2477
0.23 part TAW wax
0.33 part silicone oil SF-96
Average torque/in.²—3.24 lbs.

Example 10

10 parts ½" R. S. nitrocellulose
5 parts Vinylite VYCC
20 parts Glyptal 2570
5 parts tricresyl phosphate
0.28 part TAW wax
0.4 part silicone oil SF-96
Average torque/in.²—1.27 lbs.

Example 11

10 parts ½" R. S. nitrocellulose
5 parts Vinylite VYCC
20 parts Glyptal 2477
5 parts Hercoflex #150
0.28 part TAW wax
0.40 part silicone oil SF-96
Average toque/in.²—2.07 lbs.

Example 12

10 parts ½" R. S. nitrocellulose
2.5 parts Vinylite VYCC
20 parts Glyptal 2570
5 parts tricresyl phosphate
0.26 part TAW wax
0.38 part silicone oil SF-96
Average torque/in.²—1.35 lbs.

We claim:

1. An ice-releasing coating composition comprising a volatile organic solvent solution of nitrocellulose, and containing for each 10 parts of nitrocellulose; 10 to 20 parts non-drying vegetable oil modified glycerol phthalate resin, 2.5 to 5.0 parts of a copolymer of vinyl chloride and vinyl acetate, 0.1 to 0.3 part of a petroleum hydrocarbon wax and sufficient volatile organic solvent to give a spraying composition containing on the order of 20 to 25% non-volatile ingredients.

2. A coating composition as in claim 1 containing 0.3 to 0.8 part of dimethyl polysiloxane oil for each 10 parts of nitrocellulose.

3. A coating composition as in claim 1, where non-drying vegetable oil modified glycerol phthalate resin is a 30% coconut oil modified glycerol-phthalate resin.

4. A coating composition as in claim 1, where non-drying vegetable oil modified glycerol phthalate resin is a 38% castor oil modified glycerol phthalate.

5. A coating composition as in claim 1, where the copolymer contains 62% vinyl chloride and 38% vinyl acetate.

6. A coating composition as in claim 1 containing 2 to 4 parts of a plasticizer for a vinyl resin for each 10 parts of nitrocellulose.

7. An ice release coating composition consisting of pigment dispersed in a vehicle comprising a volatile organic solvent solution of nitrocellulose containing in solution, for each 10 parts of nitrocellulose; 10–20 parts non-drying vegetable oil modified glycerol phthalate, 2.5 to 5.0 parts of a copolymer of vinyl chloride and vinyl acetate, 2 to 4 parts of a plasticizer for a vinyl resin, 0.1 to 0.3 part of a petroleum hydrocarbon wax, and sufficient volatile organic solvent to give a coating containing on the order of 20 to 30% non-volatile ingredients.

8. A coating composition as in claim 7, containing 0.3 to 0.8 part of dimethyl polysiloxane oil for each 10 parts of nitrocellulose.

9. An ice-releasing coating composition comprising a volatile organic solvent solution of nitrocellulose, and containing for each 10 parts of nitrocellulose: 10 to 20 parts of non-drying vegetable oil modified glycerol phthalate resin, 2.5 to 5.0 parts of a polymer of vinyl acetate, 0.1 to 0.3 part of a petroleum hydrocarbon wax and sufficient volatile organic solvent to give a composition containing 20 to 30% non-volatile ingredients.

References Cited in the file of this patent

UNITED STATES PATENTS

| Number | Name | Date |
|---|---|---|
| 1,784,802 | Ellis | Dec. 9, 1930 |
| 1,824,757 | Ellis | Sept. 22, 1931 |
| 1,838,368 | Davidson | Dec. 29, 1931 |
| 2,223,575 | Pitman | Dec. 3, 1940 |
| 2,655,489 | Lawson | Oct. 13, 1953 |